US012806631B2

(12) United States Patent
Kujawa et al.

(10) Patent No.: US 12,806,631 B2
(45) Date of Patent: Nov. 24, 2026

(54) FLOTATION AND SOLID-LIQUID SEPARATION OF TAILINGS

(71) Applicant: EXTRAKT PROCESS SOLUTIONS, LLC, Bowling Green, KY (US)

(72) Inventors: Christian Kujawa, Bowling Green, KY (US); William R. Florman, Bowling Green, KY (US); Paul C. Painter, Boalsburg, PA (US)

(73) Assignee: Extrakt Process Solutions, LLC, Bowling Green, KY (US)

( * ) Notice: Subject to any disclaimer, the term of this patent is extended or adjusted under 35 U.S.C. 154(b) by 335 days.

(21) Appl. No.: 18/287,071

(22) PCT Filed: Apr. 29, 2022

(86) PCT No.: PCT/US2022/026878
§ 371 (c)(1),
(2) Date: Oct. 16, 2023

(87) PCT Pub. No.: WO2022/232472
PCT Pub. Date: Nov. 3, 2022

(65) Prior Publication Data
US 2024/0198359 A1 Jun. 20, 2024

Related U.S. Application Data

(60) Provisional application No. 63/182,305, filed on Apr. 30, 2021.

(51) Int. Cl.
*B03D 1/08* (2006.01)
*B03B 9/02* (2006.01)

(52) U.S. Cl.
CPC ................ *B03D 1/085* (2013.01); *B03B 9/02* (2013.01); *B03D 2201/002* (2013.01); *B03D 2203/006* (2013.01); *B03D 2203/08* (2013.01)

(58) Field of Classification Search
CPC ...................................................... B03D 1/085
See application file for complete search history.

(56) References Cited

U.S. PATENT DOCUMENTS 4,693,830 A * 9/1987 Thornton .................. C02F 1/54 210/734
5,186,257 A * 2/1993 Stahl ........................ C09K 8/24 166/270.1
(Continued)

FOREIGN PATENT DOCUMENTS

CL 2022001052 A1 2/2023
MX 2021005031 A 9/2021
(Continued)

OTHER PUBLICATIONS

Kaidi Zheng, Xiangning Bu, Shaoqi Zhou, Jing Zhang, Huaizhi Shao, Jie Sha, Guangyuan Xie, "Effects of monovalent and divalent ions in coal gasifiction brine on the froth entrainment and flotation kinetics of anthracite coal". 2020. Physicochem. Probl. Miner. Process., 56(5), 2020, 960-974. (Year: 2020).*
(Continued)

*Primary Examiner* — Patrick H Mackey
(74) *Attorney, Agent, or Firm* — Morgan, Lewis & Bockius LLP

(57) ABSTRACT

A process of flotation of partially or fully liberated metal-bearing or industrial minerals, hydrocarbon matter, oil or bitumen from an ore includes combining an indifferent salt to a flotation system to increase efficiency of the flotation process as well as the subsequent flotation concentrate and tailings solid-liquid separation.

20 Claims, 5 Drawing Sheets

(56) References Cited

U.S. PATENT DOCUMENTS

| | | | | |
|---|---|---|---|---|
| 7,378,238 | B2 * | 5/2008 | Hilbrig | C12N 15/1017 536/23.1 |
| 8,936,770 | B2 * | 1/2015 | Burba, III | C25B 7/00 423/20 |
| 8,986,503 | B2 * | 3/2015 | Kemp | C02F 1/24 162/190 |
| 9,174,856 | B2 | 11/2015 | Matsufuji et al. | |
| 9,457,295 | B2 * | 10/2016 | Ren | C02F 11/147 |
| 10,138,427 | B2 * | 11/2018 | Lupinsky | C10G 1/045 |
| 12,129,192 | B2 * | 10/2024 | Painter | C02F 11/148 |
| 12,473,219 | B2 * | 11/2025 | Painter | C02F 9/00 |
| 2010/0187181 | A1 * | 7/2010 | Sortwell | C22B 3/42 210/726 |
| 2014/0144815 | A1 | 5/2014 | Liu et al. | |
| 2015/0014248 | A1 | 1/2015 | Herron et al. | |
| 2017/0369788 | A1 | 12/2017 | Lupinsky et al. | |
| 2019/0071332 | A1 * | 3/2019 | Painter | C02F 1/68 |
| 2021/0379605 | A1 | 12/2021 | Jansson | |
| 2022/0380242 | A1 | 12/2022 | Jansson | |

FOREIGN PATENT DOCUMENTS

| | | | | |
|---|---|---|---|---|
| WO | 2018/144336 | A1 | 8/2018 | |
| WO | WO-2020018397 | A1 * | 1/2020 | C02F 11/148 |
| WO | 2020/172265 | A1 | 8/2020 | |

OTHER PUBLICATIONS

International Search Report and Written Opinion dated Jul. 29, 2022, issued in corresponding International Patent Application No. PCT/US2022/026878.

Filippov et al., "Salt effect on gas dispersion in flotation column—Bubble size as a function of turbultent intensity", Minerals Engineering 127 (2018) 6-14.

Extended European Search Report dated Jan. 20, 2025, issued in corresponding European Patent Application No. 22796781.7.

Office Action dated Apr. 13, 2026, issued in corresponding European Patent Application No. 22796781.7.

Office Action dated Jul. 13, 2025, issued in corresponding Saudi Arabia Patent Application No. 523451352.

Office Action dated Jan. 6, 2026, issued in corresponding Saudi Arabia Patent Application No. 523451352.

Office Action dated Feb. 11, 2026, issued in corresponding Kuwait Patent Application No. KW/P/2023/004062.

Notice of Opposition dated Nov. 25, 2024, issued in corresponding Chilean Patent Application No. 2023-03183.

Notice of Opposition dated Jul. 17, 2024, issued in corresponding Chilean Patent Application No. 2023-03183.

Office Action dated May 22, 2026, issued in corresponding Chilean Patent Application No. 2023-03183.

* cited by examiner

FLOTATION AND SOLID-LIQUID SEPARATION OF TAILINGS

CROSS-REFERENCE TO RELATED APPLICATION

This application is the U.S. National Phase under 35 U.S.C. § 371 of International Patent Application No. PCT/US2022/026878, filed on Apr. 29, 2022, which claims the benefit of U.S. Provisional Application No. 63/182,305, filed 30 Apr. 2021, the entire disclosure of which is hereby incorporated by reference herein.

TECHNICAL FIELD

The present disclosure relates to improving the recovery rate and/or yield of a flotation operation by managing certain dissolved ions in the flotation operation. The process will also improve the solid-liquid separation rate and efficiency of the flotation products.

BACKGROUND

Mined ore and coal are usually crushed and/or pulverized to detach (or liberate) the valuable components from waste rocks prior to subjecting them to appropriate solid-solid separation processes. Water is typically used as a process medium as well as a transport medium in such operations, as well as for solid-solid separation processes.

Bubble flotation is a highly versatile process for physically separating particles based on differences in the ability of gas bubbles generated in the process to adhere to surfaces of different particles in a slurry. In general, a flotation operation includes forming gas bubbles in a slurry including different particles in an aqueous medium. Gas bubbles introduced into such a slurry attach, either through physical or chemical means, to particles with hydrophobic surfaces which carry such particles to the top of the slurry. When aggregates, the bubble attached particles, form a forth that can be removed as a concentrate, while particles with hydrophilic surfaces remain in the slurry thus separating particles with hydrophobic surfaces from the slurry. Hydrocarbon, oil-holding minerals, metal-bearing and industrial minerals can be recovered by flotation from ore when sufficiently liberated from the ore.

The floated concentrate, which are usually the valuable materials, are in the form of aqueous slurry. The barren residue from flotation, commonly called tailings, are also in the form of an aqueous slurry of particles. The tailings generally require subsequent solid-liquid separation, such as by thickening and often also by filtering of the solids, to recover water to recycle within the process and to maximize the water utilization.

At times, reagents used to improve the flotation performance, have a negative impact on the subsequent dewatering by solid-liquid separation of the tailings. When clays are present, solid-liquid separation of tailings often becomes so difficult that dewatering of the tailing makes the dewatering as well as the whole extraction process uneconomical.

There is a continuing need to improve the performance of flotation, as well as the subsequent recovery of process water by solid-liquid separation of tailings.

SUMMARY OF THE DISCLOSURE

Advantages of the present include improved flotation rate and/or recovery due to selective ion concentration of water used in the flotation operation.

These and other advantages are satisfied, at least in part, by a process including forming a feed slurry, which includes solid particles in ion managed water, in a flotation operation. Advantageously, the ion managed water has a high concentration of dissolved indifferent monovalent ions and a low concentration of dissolved multivalent ions.

Another aspect of the present disclosure includes a process of separating materials by flotation by treating a source of water to have a high concentration of dissolved indifferent monovalent ions and a low concentration of dissolved multivalent ions in the source water to form an ion managed water, and combining the ion managed water with crushed ore to form a feed slurry, which includes solid particles in ion managed water, in a flotation operation. Advantageously, the concentration of dissolved indifferent monovalent ions is sufficiently high and the concentration of dissolved multivalent ions is sufficiently low to improve the flotation operation and improve a liquid-solid separation operation.

Embodiments of the present disclosure include can include one or more of the following features individually or combined. For example, the ion managed water can be sourced from one or more of: (i) an external make-up water source, (ii) water recovered from a solid-liquid separation process, and/or (iii) water reclaimed from a tailings storage facility. In some embodiments, the source of water can be treated to form the ion managed water having the concentration of dissolved indifferent monovalent ions and the concentration of dissolved multivalent ions. For example, the source of water can be treated by nanofiltration, ion exchange resins, electrodialysis, a precipitation system to reduce the concentration of multivalent ions dissolved in the source of water. In other examples, the source of water can be treated by adding indifferent monovalent salts to the source of water to increase the concentration of the monovalent ions dissolved in the source of water. In other embodiments, the source of water can be treated to reduce a concentration of multivalent ions selected among calcium, magnesium and sulfate ions and reducing the concentration of the multivalent ions, e.g., to no more than about 200 ppm, in the source of water. In still further embodiments, the source of water can be analyzed to determine the concentration of dissolved indifferent monovalent ions and the concentration of dissolved multivalent ions and treating the source of water to have the concentration of dissolved indifferent monovalent ions and the concentration of dissolved multivalent ions of the process water in the feed slurry.

In other embodiments, the process can include combining the ion managed water with crushed ore to form the feed slurry. In still further embodiments, the flotation operation can generate tailings and the process further includes treating the tailings with a polymer flocculant to form a treated tailings having consolidated solids and clarified water. Advantageously, the clarified water can be separated from the consolidated solids and the clarified water can have a concentration of the dissolved indifferent monovalent salts of at least 0.5 wt %. The separated clarified water can also be recycled as a source of water to the flotation operation. In some embodiments, the consolidated solids can be discharged to a tailings storage facility. Reclaimed water can be separated from the consolidated solids in the tailings storage facility and recycled as a source of water to form the ion managed water in the flotation operation.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
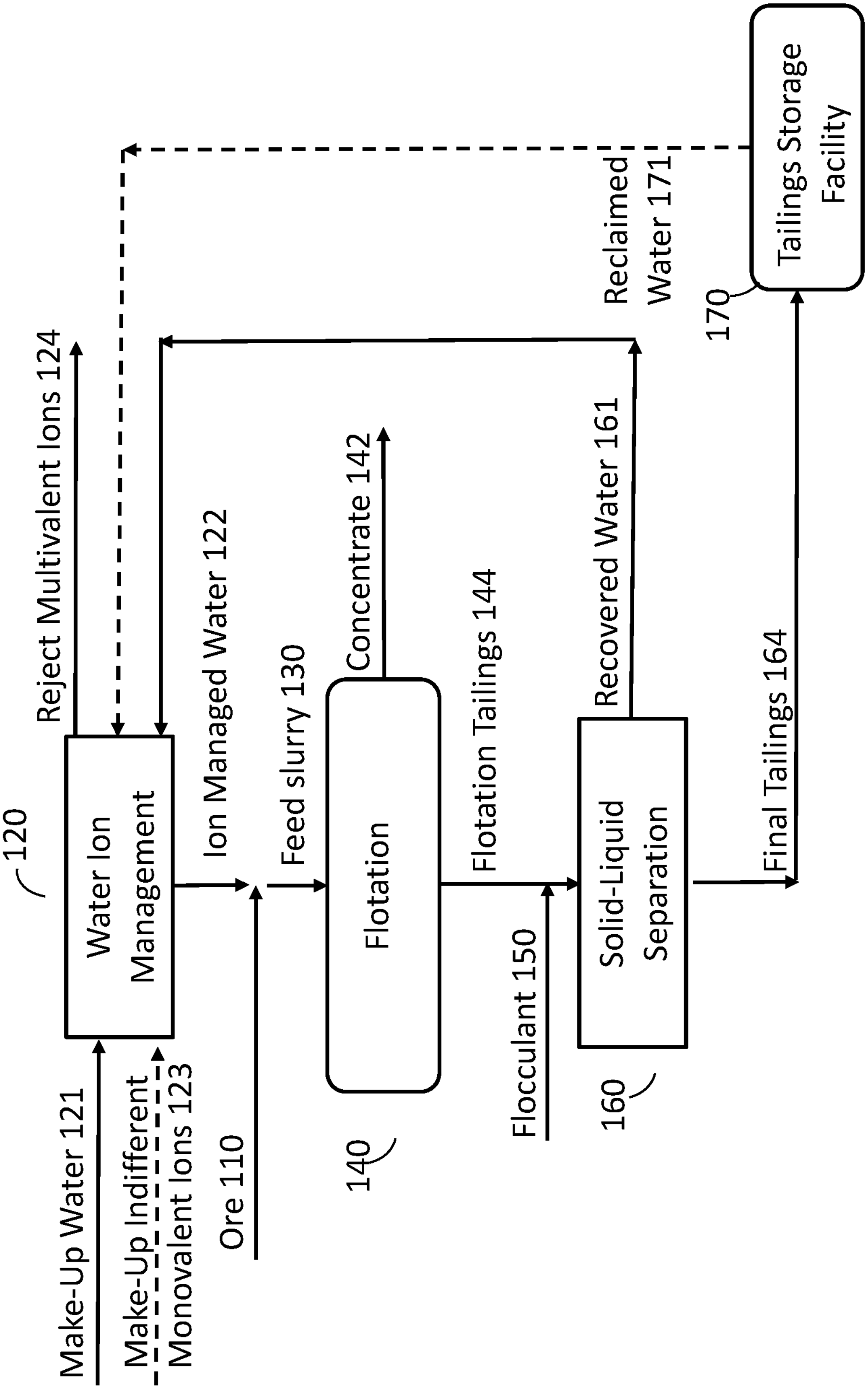
FIG. 1 is a schematic illustration of a flotation flowsheet that can be used in practicing certain aspects of the present disclosure.

The present disclosure relates to improving recovery of desirable materials from a flotation operation. Flotation of target materials including oil, bitumen, hydrocarbon, metal-bearing or industrial minerals such as coal, oil, bitumen, tar, precious metals, base metals, platinum group metals, iron mineral, rare earth elements, heavy metals, alkali and alkaline metals, halides, fluorides, chlorides, phosphates, carbonates, silicates, oxides, etc. can be used in processes of the present disclosure.

In practicing aspects of the present disclosure, water used in a flotation operation is managed to simultaneously have a sufficiently high concentration of dissolved indifferent monovalent salt ions and a sufficiently low concentration of dissolved multivalent salt ions (ion managed water) to improve the flotation operation. In addition, when the concentration of dissolved indifferent monovalent salt ions is sufficiently high in the flotation operation, unwanted solids in tailings generated from the flotation operation can be more readily dewatered and consolidated allowing higher rate of solid-liquid separation and recycle of recovered water back to the flotation operation.

Ion managed water having a sufficiently high concentration of indifferent monovalent ions and sufficiently low multivalent ion concentration can improve yields of recovered materials by about 0.5%, 1%, 2%, 3%, 4% and higher relative to use of water without appreciable amounts of dissolved indifferent monovalent salts or with water having a high concentration of multivalent ions. In an aspect of the present disclosure, a flotation operation can be used to recover desirable materials such as hydrocarbon, metal-bearing minerals or industrial minerals such as coal, oil, bitumen, tar, precious metals, base metals, platinum group metals, iron mineral, rare earth elements, heavy metals, alkali and alkaline metals, halides, fluorides, chlorides, phosphates, carbonates, silicates, oxides etcetera. The flotation operation can take the form of direct flotation of the desirable material, or by reverse flotation in which the unwanted materials are floated to achieve separation of desirable materials.

Certain processes of the present disclosure can be practiced by forming a feed slurry, which includes solid particles in ion managed water, in a flotation operation. One or more sources of water can be used to form the ion managed water. Advantageously, the ion managed water has a high concentration of dissolved indifferent monovalent ions and a low concentration of dissolved multivalent ions. For example, the ion managed water can have a concentration of dissolved indifferent monovalent ions of at least 0.3 wt % and preferably no less than about 0.5 wt %, 0.75 wt %, 1 wt %, 1.5 wt %, 2 wt % and even at least about 2.5 wt % 3 wt %, 4 wt %, 5 wt %, etc. Simultaneously, the ion managed water has a concentration of dissolved multivalent ions of no more than 0.3 wt %, such as no more than about 0.25 wt %, 0.2 wt %, 0.15 wt %, 0.1 wt % or even less than about 500 ppm (0.0500 wt %), 400 ppm, 300 ppm, or less than about 200 ppm of dissolved multivalent ions. Such that the formed ion managed water has a high concentration of dissolved indifferent monovalent ions and a low concentration of dissolved multivalent ions.

As used herein an indifferent monovalent ion is highly soluble in water and can be derived from an indifferent salt that disassociates into a monovalent cation and an anion, and remains dissolved in an aqueous phase of the process without precipitating from a slurry throughout the process and remains dissolved in any recycled aqueous liquid. The indifferent monovalent ion further does not chemically react to form coagulates or chemically react with components of a slurry such as polymer flocculant during the process or undergo oxidation or reduction reactions during the process. Such indifferent monovalent ions are advantageous since they remain dissolved in the aqueous phase of slurries and can be substantially recovered in an aqueous phase and thus subsequently reused.

Indifferent salts that are useful in practicing processes of the present disclosure include salts having a monovalent cation without multivalent cations, e.g., alkali halide salts such as sodium chloride, potassium chloride. Ammonium based salts without multivalent ions can also be used such as ammonium chloride ($NH_4Cl$), ammonium bromide ($NH_4Br$). Mixtures of such salts can also be used.

When a sufficiently high concentration of dissolved indifferent monovalent ions is included in treating process water, ore or a feed slurry, the indifferent monovalent ions can destabilize and consolidate solids in a slurry. For a relatively short process times with a relatively low energy input, a total dissolved indifferent salt concentration should preferably be on solution basis at least of at least 0.3 wt % and preferably no less than about 0.5 wt %, 0.75 wt %, 1 wt %, 1.5 wt %, 2 wt % and even at least about 2.5 wt % 3 wt %, 4 wt %, 5 wt %, etc. Determination of the concentration of the indifferent salt dissolved in the aqueous fraction includes the amount added together with any indifferent salt that may already be part of the aqueous fraction of the feed slurry prior to addition of indifferent salt to the process.

In some embodiments of the present processes, it can be more advantageous to use a natural source of the indifferent salt or salts such as in a natural body of saline water including such salts in sufficiently high concentration such as at least about 2 wt % and even at least about 3 wt % or greater. For example, ocean or seawater can be used as a source of indifferent salts, which can significantly improve the economics of the process under certain conditions. The vast majority of seawater has a salinity of between 31 g/kg and 38 g/kg, that is, 3.1 to 3.8 wt %. On average, seawater in the world's oceans has a salinity of about 3.5 wt % (35 g/L, 599 mM). Seawater includes a mixture of salts, containing not only sodium chloride as sodium cations and chlorine anions (together totaling about 85% of the dissolved salts present), but also sulfate anions and calcium, potassium and magnesium cations. There are other ions present (such as bicarbonate), but these are the main components. Another natural source of highly soluble salts that can be used as a source of highly soluble salts includes a hypersaline body of water, e.g., a hypersaline lake, pond, or reservoir. A hypersaline body of water is a body of water that has a high concentration of sodium chloride and other highly soluble salts with saline levels surpassing ocean water, e.g., greater than 3.8 wt % and typically greater than about 10 wt %. Such hypersaline bodies of water are located on the surface of the earth and also subsurface, which can be brought to the surface as a result of ore mining operations. Such natural bodies of saline water can be used as a source of dissolved indifferent monovalent ions provided the multivalent ions are reduced to a low concentration.

In other embodiments of the present processes, it can be advantageous to use a brine produced in desalinization of salt water as a source of an indifferent salt. The brine can be used alone as a source of the indifferent salt(s) or in combination with another source of indifferent salt(s) such as seawater. Such brines and natural bodies of saline water can be used as a source of dissolved indifferent monovalent ions provided the multivalent ions are reduced to a low concentration.

Multivalent ions unless specifically utilized in creating hydrophobic mineral surfaces with the aim for flotation otherwise generally impact flotation negatively. Divalent cations if above a certain concentration in the solution tend to activate the quartz and other particles, cause sliming, reagent sterilization and excessively stable flotation froth. These multivalent ions require removal therefore ahead of flotation. One such example is the removal of $Ca^{2+}$ and $Mg^{2+}$ ions, often through the addition of soda ash ($Na_2CO_3$) which when added precipitates out calcium and magnesium carbonates at sufficiently high pH values. Other removal technologies, such as for example nano-filtration, can also be utilized.

FIG. 1 illustrates a flow diagram that can be used in practicing certain aspects of the present disclosure. As shown in the figure, ore 110, such as crushed ore or a slurry of ore, can be combined with ion managed water 122 to form a feed slurry 130 for a flotation operation 140. Flotation operation 140 separates desired particulate materials from the feed slurry 130 from unwanted solids. The desired particulate materials are discharged as a concentrate 142 in the form of an aqueous slurry and the unwanted materials are discharged as flotation tailings 144, an aqueous suspension of unwanted solids. Since the flotation tailings include a considerable amount of water, the flotation tailings are subjected to a solid-liquid separation operation 160 which can include addition of flocculant 150 to consolidate the suspended solids in the tailings. Water recovered 161 from the solid-liquid separation operation 160 can be recycled back to the flotation operation. Final tailings 164 from the solid-liquid separation operation 160 can be discharged to a tailings storage facility 170 and reclaimed water 171 from such a facility optionally can be recycled back to the flotation operation.

Figure 2:
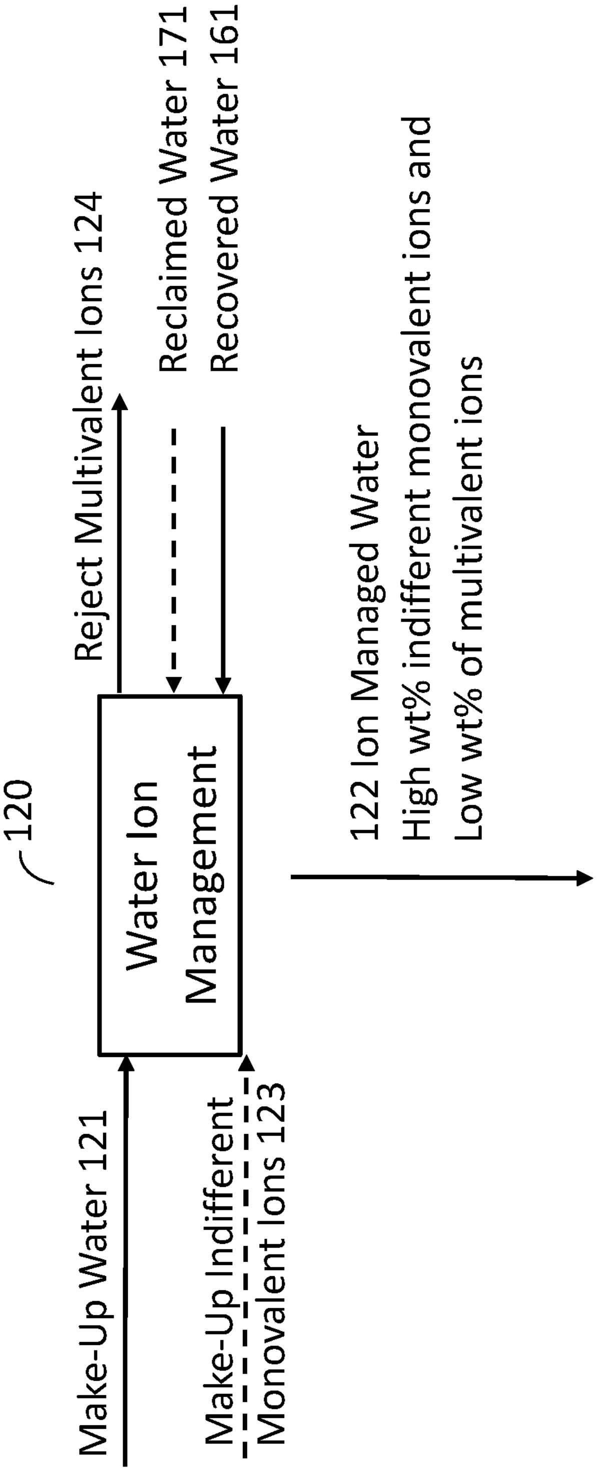
FIG. 2 is a schematic illustration of a water ion management flow sheet of FIG. 1.

An advantage of the present process is the management of the type and concentration of ions in the water used to generate the feed slurry 130 for use in the flotation operation 140. As illustrated in FIG. 2, water ion management operation 120 generates ion managed water such that the concentration of dissolved indifferent monovalent ions is sufficiently high and the concentration of dissolved multivalent ions is sufficiently low to improve the flotation operation and optionally to improve the subsequent liquid-solid separation operation. The ion managed water can be sourced from one or more of: (i) an external make-up water source 121, (ii) recovered water 161 from the solid-liquid separation process 160, and/or (iii) reclaimed water 171 from the tailings storage facility 170. The water sources can be treated to adjust the ion concentration and/or different water sources can be combined in appropriate ratios to achieve an appropriate type and concentration of ions to generate the ion managed water. For example, one or more of the water sources can be treated to reduce a concentration of multivalent ions, such as those selected among calcium, magnesium and sulfate ions. The water sources can be treated to reduce a concentration of multivalent ions by any one or more of nanofiltration, reverse osmosis, use of ion exchange resins, electrodialysis, precipitation techniques such as by adding soda ash or use of a pellet reactor, or other techniques that reduce multivalent ions in water. Rejected multivalent ions can be separated from any one or combination of sources of water 124. In addition, or as an alternative, one or more of the water sources can be treated to increase the concentration of the monovalent ions dissolved in the source of water by adding indifferent monovalent salts to the source of water. Indifferent monovalent ions or make-up indifferent monovalent ions 123 can be added directly in dry form or dissolved in an aqeuous solution at the water ion management operation 120 or elsewhere expediently to the flowsheet to augment the indifferent monovalent ion concentration going to flotation and subsequent dewatering operations.

Further, and as an optional part of the water ion management operation 120, any one or more of the sources of water can be analyzed to determine a concentration of dissolved indifferent monovalent ions and a concentration of dissolved multivalent ions for the analyzed water source to aid in control of the ion management. Analysis can be either at set times at which process stream samples are taken, prepared and analyzed by conventional water analysis or through analysis by on-line instrumentation. For example, certain multivalent ion concentration can be determined by titration methods. Further, ionic conductivity can provide an estimate of all ions in a water source and, when combined with titration methods to determine multivalent ions, can be used to indirectly determine a concentration of monovalent ions in the source of water by subtracting the concentration of multivalent ions determined by titration from the concentration of total ions determined by ionic conductivity measurements. Chloride content can be used to estimate alkali halide monovalent salt concentrations if the multivalent ion concentration has been sufficiently reduced. Dissolved ions can be measured by the zeta-potential. As mineralogy, solids concentration and water chemistry are different for each application, the target zeta-potential will be different for each application as well. Once the concentrations for dissolved indifferent monovalent ions and/or dissolved multivalent ions are determined, the source water can be treated or different sources of water with different concentrations of ions can be appropriately combined to form the ion managed water having the desired type and concentration of ions. The target concentration of indifferent ions needed is determined by the efficacy of the flotation and subsequent solids-liquid dewatering operations.

The indifferent ion management adjustment required can be determined more directly by batch analysis of stream samples or on-line continuously by zeta-potential measurement. One such zeta-potential measuring technique is streaming potential measurement. As mineralogy, solids concentration and water chemistry are different for each application, the target zeta-potential will be different for each application and needs to be determined for up front for each application. The lower the multivalent ion concentration the more accurate and applicable the zeta-potential measurement technique will be for the implementation of this invention.

Another advantage of processes of the present disclosure includes recycling dissolved indifferent monovalent ions. Since such ions remain almost entirely in the aqueous phase of each of operations including flotation, liquid-solid separation and tailings storage, the dissolved indifferent monovalent ions can be recovered with the separation of an aqueous phase in any operation.

However, during flotation operations, unwanted multivalent ions can also enter a water circuit. Waters contain dissolved solids. This is true for the fresh water used for make-up as for the recycled process water. Additionally, during the wet processes in, for example, grinding and flotation, some solids dissolve in the aqueous phase, which can include dissolution of multivalent ions into the process water used in the plant. As water is recycled with little loss to the tailings and concentrate, the concentration of ions within the water will increase through the continued dissolution of solids from the fresh mineral feed. The type of ions that dissolve depends on the minerals present in the feed to the concentrator and the type of ions in the water. As the geology and therefor also the mineralogy differs from location to location, each concentrator tends to have a fingerprint dissolved ion distribution in the process water. The dissolved cations and anions can range include monovalent and multivalent ions. Most ions that tend to dissolve from the minerals in the feed tend to be multivalent in nature, necessitating the removal of the multivalent ions from the process water to improve flotation and solid-liquid separation performance. To address, multivalent ions entering and concentrating during the recycle of water in flotation and liquid solid separation operations, the present disclosure employs water ion management to reduce the concentration of multivalent ions dissolved in source water or recycled water and maintain or increase the dissolved indifferent monovalent ions.

Solid-liquid separation operation 160 can be carried out, for example, by thickening followed by filtration, e.g., bed filtration, to recover water (161) from the flotation tailing (144). The solid-liquid separation can be implemented using other solid-liquid separation systems such as for example centrifuging, crossflow filtration or counter-current decantation. In one aspect of the present disclosure, the flotation tailings include a sufficiently high concentration of indifferent salt to improve separation of solids from the aqueous phase of the flotation tailings. In one aspect of the disclosure, the flotation concentrate or tailing produced include an indifferent salt at sufficient concentration and can be directly filtered to remove solids without diluting the feed slurry and/or without use of a thickener apparatus. That is, the tailings has a concentration of dissolved indifferent monovalent ions of at least 0.3 wt % and preferably no less than about 0.5 wt %, 0.75 wt %, 1 wt %, 1.5 wt %, 2 wt % and even at least about 2.5 wt % 3 wt %, 4 wt %, 5 wt %, etc. In one aspect of the disclosure, the flotation concentrate or tailing produced include an indifferent salt at sufficient concentration and can be directly filtered to remove solids without diluting the feed slurry and/or without use of a thickener apparatus.

Examples

The following examples are intended to further illustrate certain aspects of the subject technology and are not limiting in nature. Those skilled in the art will recognize, or be able to ascertain, using no more than routine experimentation, numerous equivalents to the specific substances and procedures described herein.

Figure 3:
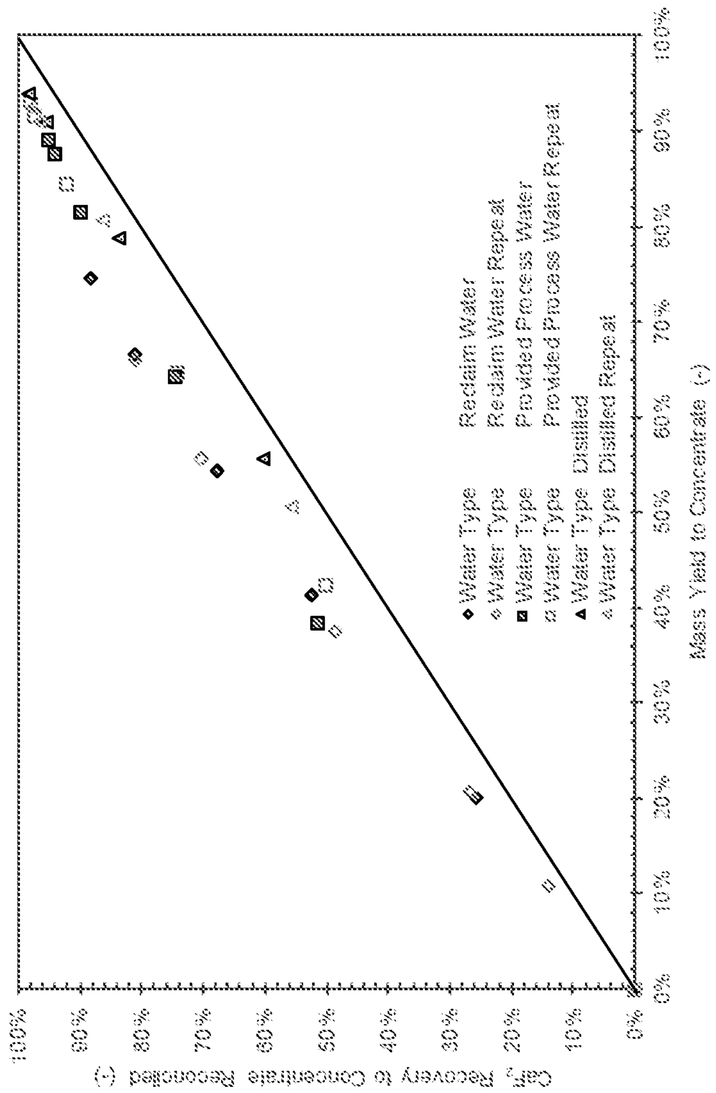
FIG. 3 is a plot that compares fluorite ($CaF_2$) recovery in a fluorite flotation operation for a series of water types that vary in ion concentration.
Figure 4:
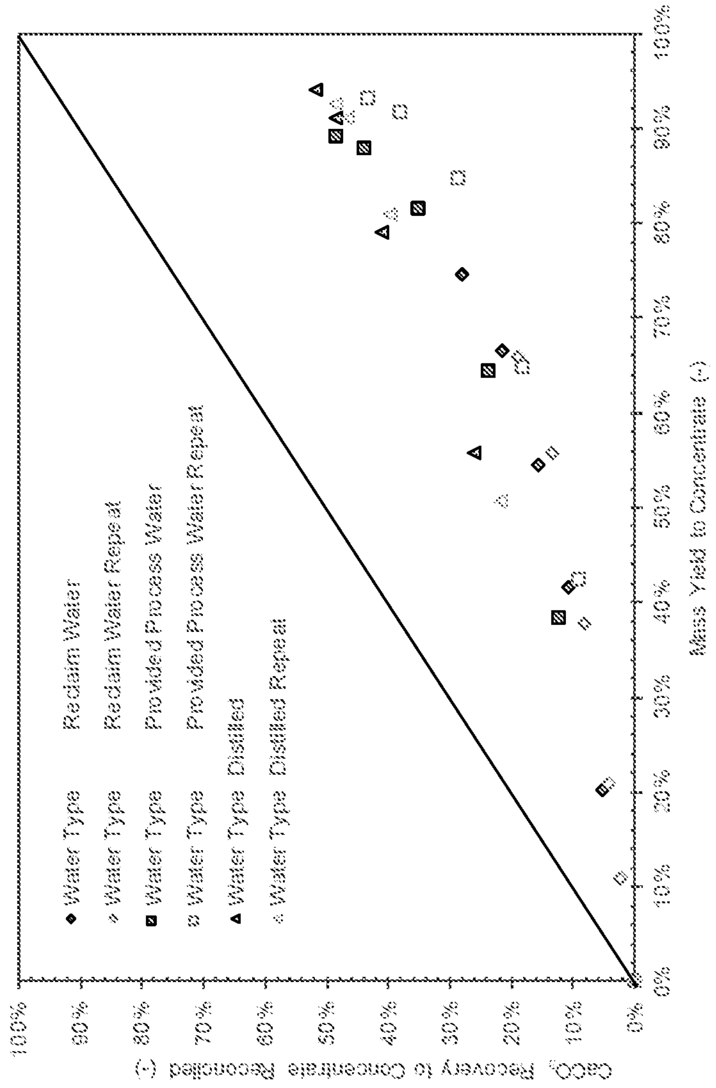
FIG. 4 is a plot that compares carbonate ($CaCO_3$) depression in a fluorite flotation operation for a series of water types that vary in ion concentration.
Figure 5:
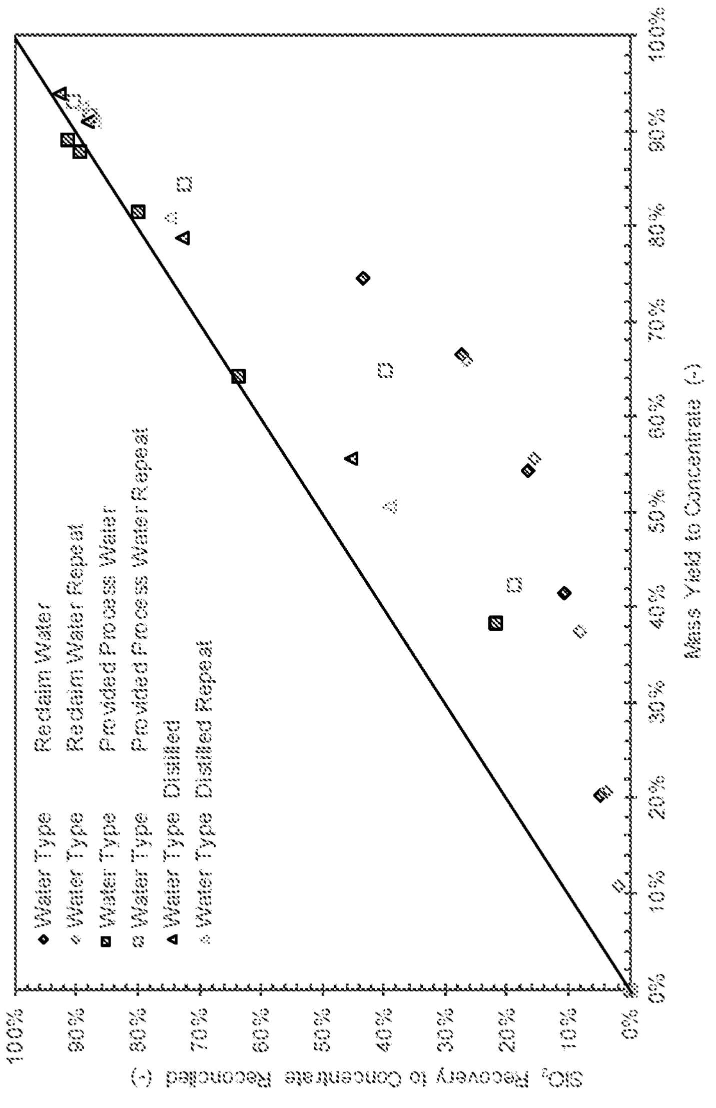
FIG. 5 is a plot that compares silica ($SiO_2$) depression in a fluorite flotation operation for a series of water types that vary in ion concentration.

Different water types were used in controlled laboratory batch flotation to separate desired fluorite ($CaF_2$) minerals from gangue such as calcium carbonite ($CaCO_3$) and silica ($SiO_2$). The water types included (i) reclaimed water with a high concentration of dissolved indifferent monovalent ions which was recovered from a solid-liquid separation, (ii) process water recovered from the full-scale plant flotation operation that did not include a high concentration of dissolved indifferent monovalent ions, and (iii) distilled water, which is almost devoid of any dissolved ions. FIGS. 3, 4, and 5 are plots comparing calcium fluorite ($CaF_2$) recovery, calcium carbonate ($CaCO_3$) and silica ($SiO_2$) depression, respectively, in the flotation operation. Each water type test was repeated. As shown by the data in the figures, fluorite recovery was positively affected with use of the reclaimed water having the high concentration of dissolved indifferent monovalent ions and both unwanted materials of calcium carbonate ($CaCO_3$) and silica ($SiO_2$) were negatively affected with use of the reclaimed water high in indifferent ions relative to the other two water types, low in indifferent ions.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention and are covered by the following claims.

What is claimed is:

1. A process of separating materials by flotation, the process comprising:

analyzing a source of water to determine a concentration of dissolved indifferent monovalent ions and a concentration of dissolved multivalent ions;

treating the source of water to form an ion managed water, wherein, in the ion managed water, the concentration of dissolved indifferent monovalent ions is 0.3 wt % to 5 wt % and the concentration of dissolved multivalent ions is no more than 0.3 wt %;

combining the ion managed water with crushed ore to form a feed slurry, which includes solid particles in the ion managed water, in a flotation operation; and recovering the materials, wherein the materials include at least one selected from oil, bitumen, hydrocarbon, coal, tar, a halide, a fluoride, a chloride, a carbonate, a silicate, and an oxide, wherein the source of water includes: (i) an external make-up water source, (ii) water recovered from a solid-liquid separation process, and/or (iii) water reclaimed from a tailings storage facility, or a combination of (i) to (iii).

2. The process of claim 1, wherein the source of water is treated by nanofiltration, reverse osmosis, ion exchange resins, electrodialysis, or a precipitation system to reduce the concentration of the dissolved multivalent ions in the source of water.

3. The process of claim 2, further comprising treating the source of water to reduce the concentration of the dissolved multivalent ions, wherein the dissolved multivalent ions includes one or more of a calcium ion, a magnesium ion, and a sulfate ion, and reducing the concentration of the dissolved multivalent ions to no more than about 200 ppm in the source of water.

4. The process of claim 1, wherein the source of water is treated by adding indifferent monovalent salts to the source of water to increase the concentration of the dissolved indifferent monovalent ions in the source of water.

5. The process of claim 1, wherein the flotation operation generates tailings, and the process further comprises treating the tailings with a polymer flocculant to form a treated tailings having consolidated solids and clarified water, and separating the clarified water from the consolidated solids, wherein the clarified water has a concentration of the dissolved indifferent monovalent ions of at least 0.5 wt %, and recycling the clarified water as a source of water to the flotation operation.

6. The process of claim 5, further comprising discharging the consolidated solids to a tailings storage facility, separating reclaimed water from the consolidated solids in the tailings storage facility and recycling the reclaimed water as a source of water to form the ion managed water in the flotation operation.

7. The process of claim 1, wherein an indifferent monovalent salt is added in dry form to the flotation operation or dissolved in an aqueous medium and added to the flotation operation.

8. The process of claim 1, wherein the materials include fluorite.

9. The process of claim 8, wherein the source of water is water recovered from the solid-liquid separation process.

10. The process of claim 8, wherein the source of water is water reclaimed from the tailings storage facility.

11. The process of claim 10, wherein the source of water is treated by nanofiltration.

12. The process of claim 10, wherein the source of water is treated by ion exchange resins.

13. The process of claim 10, wherein the source of water is treated by electrodialysis.

14. The process of claim 1, wherein the materials include oil.

15. The process of claim 1, wherein the materials include coal.

16. The process of claim 1, wherein the materials include halide.

17. The process of claim 1, wherein the materials include chloride.

18. The process of claim 1, wherein the materials include fluoride.

19. A process of separating materials by flotation, the process comprising:

treating water reclaimed from a tailings storage facility to form ion managed water having a concentration of dissolved indifferent monovalent ions of 0.3 wt % to 5 wt % and a concentration of dissolved multivalent ions of no more than 0.3 wt %, the treating of the water includes adding indifferent monovalent salts to the water to increase a concentration of indifferent monovalent ions dissolved in the water, wherein the indifferent monovalent salts are added in dry form or dissolved in an aqueous medium, forming a feed slurry, which includes solid particles in the ion managed water, in a flotation operation, and recovering the materials including a fluoride, wherein the flotation operation generates tailings, and wherein the process further comprises:

treating the tailings with a polymer flocculant to form a treated tailings having consolidated solids and clarified water, discharging the consolidated solids to a tailings storage facility, separating reclaimed water from the consolidated solids in the tailings storage facility, and recycling the reclaimed water to form the ion managed water.

20. A process of separating materials by flotation, the process comprising:

forming a feed slurry, which includes solid particles in ion managed water, in a flotation operation, wherein the ion managed water has a concentration of dissolved indifferent monovalent ions of 0.3 wt % to 5 wt % and a concentration of dissolved multivalent ions of no more than 0.3 wt %; and recovering the materials, wherein the materials include fluorite, wherein the ion managed water is sourced from water recovered from a solid-liquid separation process or from water reclaimed from a tailings storage facility, and wherein the source of water is treated by nanofiltration.

* * * * *